Figure 1:
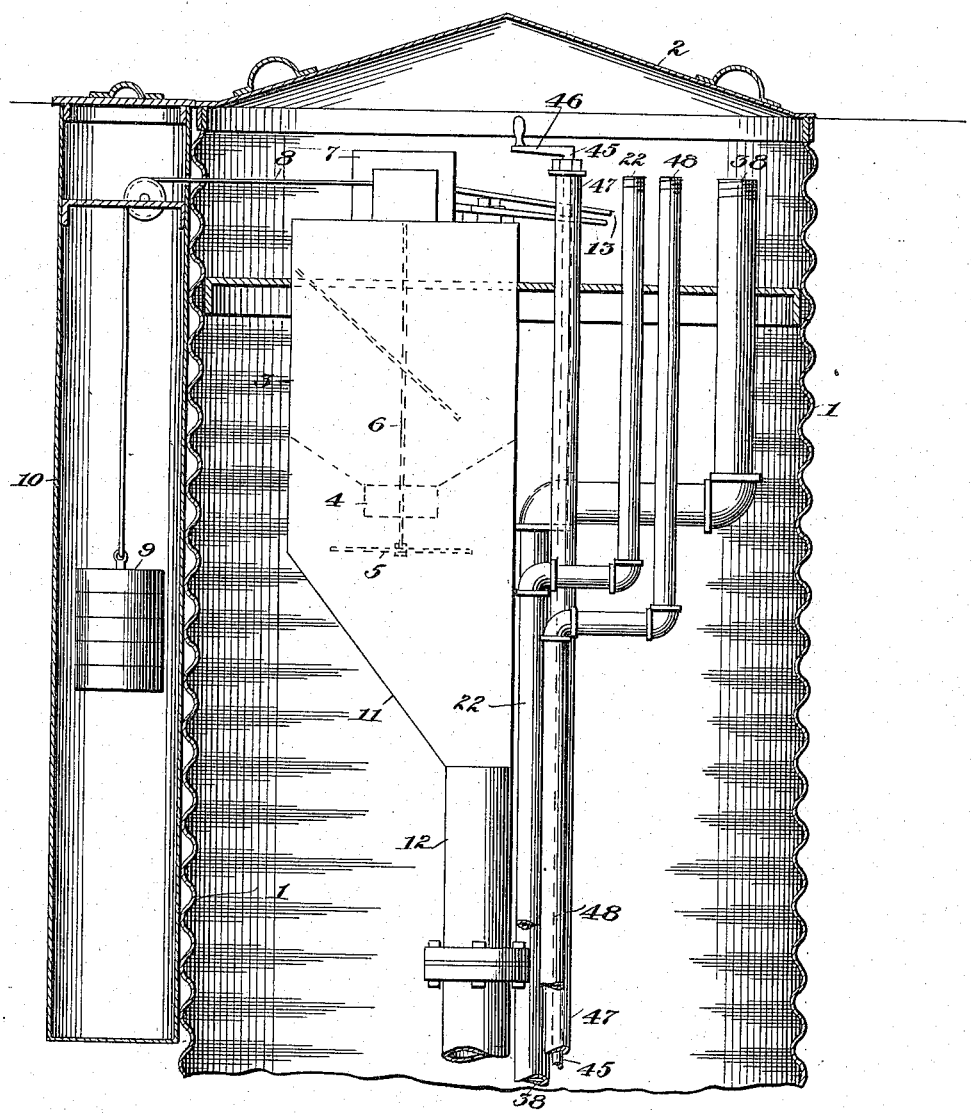

R. D. BRADEN.
ACETYLENE GAS GENERATOR AND HOLDER.
APPLICATION FILED NOV. 23, 1912.

1,148,497.

Patented Aug. 3, 1915.

R. D. BRADEN.
ACETYLENE GAS GENERATOR AND HOLDER.
APPLICATION FILED NOV. 23, 1912.

1,148,497.

Patented Aug. 3, 1915.
4 SHEETS—SHEET 4.

Witnesses:
S. N. Pond
C. J. Schmidt

Inventor:
Robert D. Braden
By Offield, Towle, Graves & Offield
Attys.

UNITED STATES PATENT OFFICE.

ROBERT D. BRADEN, OF CHICAGO, ILLINOIS, ASSIGNOR TO OXWELD-ACETYLENE COMPANY, OF CHICAGO, ILLINOIS, A CORPORATION OF WEST VIRGINIA.

ACETYLENE-GAS GENERATOR AND HOLDER.

1,148,497. Specification of Letters Patent. Patented Aug. 3, 1915.

Application filed November 23, 1912. Serial No. 733,042.

*To all whom it may concern:*

Be it known that I, ROBERT D. BRADEN, a citizen of the United States, residing at Chicago, in the county of Cook and State of Illinois, have invented certain new and useful Improvements in Acetylene-Gas Generators and Holders, of which the following is a specification.

This invention relates to acetylene-gas generators of the type wherein the gas-holder is located directly over the generation chamber, and is designed primarily for use as an underground or pit generator wherein the generation chamber and water-seal of the superposed gas-holder are located below the frost line to prevent freezing of the water therein; although some of the novel features thereof are capable of use advantageously in generators which may be otherwise located and used.

Among the salient objects of the invention are, to provide an improved mechanism for supplying water to seal the bell of the gas-holder and, through the latter, to supply the generation chamber; to provide in improved automatic float-controlled regulator for the water supplied to the gas-holder and generation chamber; to provide an improved means for stirring up the lime residuum in the generation chamber when the latter is to be cleaned out; to provide an improved means for drawing off the lime residuum from the generation chamber, including an improved mechanism for effecting the venting of the generation chamber by gas from the gas-holder during the drawing off of the residuum; to provide an improved water-seal in the generation chamber for the water-supply pipe of the latter; to provide an improved arrangement of service pipe from the gas-holder, including a drain therefor back to the generator; and, generally, to provide a compact and efficient mechanism which may conveniently be assembled in a single main tank or holder for pit use, and wherein the water and carbid may readily be supplied and drawn off without necessitating the removal of the main parts of the apparatus from the main tank or holder.

An apparatus embodying the preferred mechanical form of the invention is illustrated in the accompanying drawings, in which—

Figure 2:
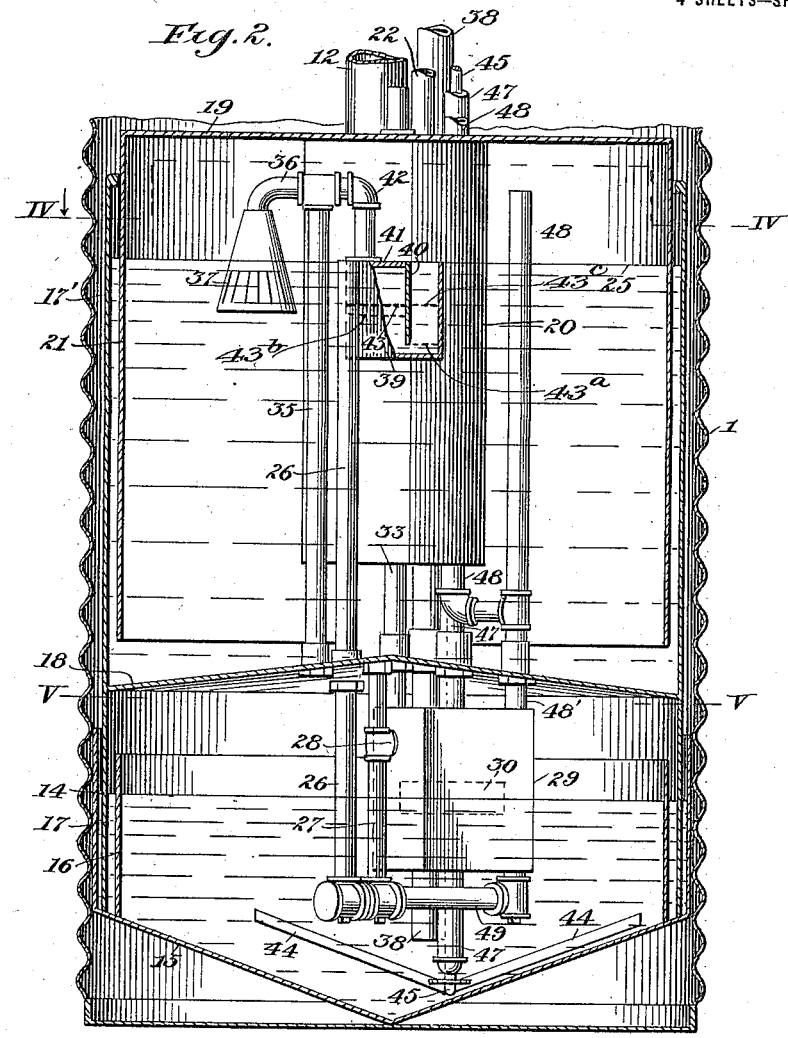
Figure 3:
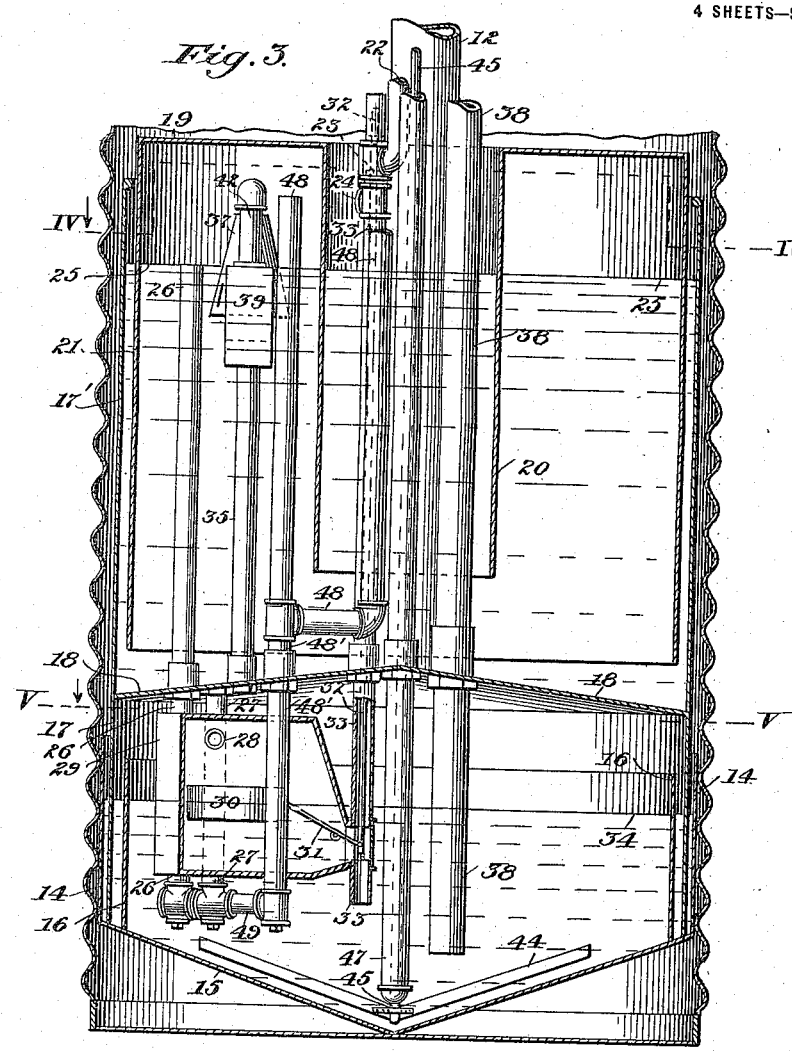
Figure 4:
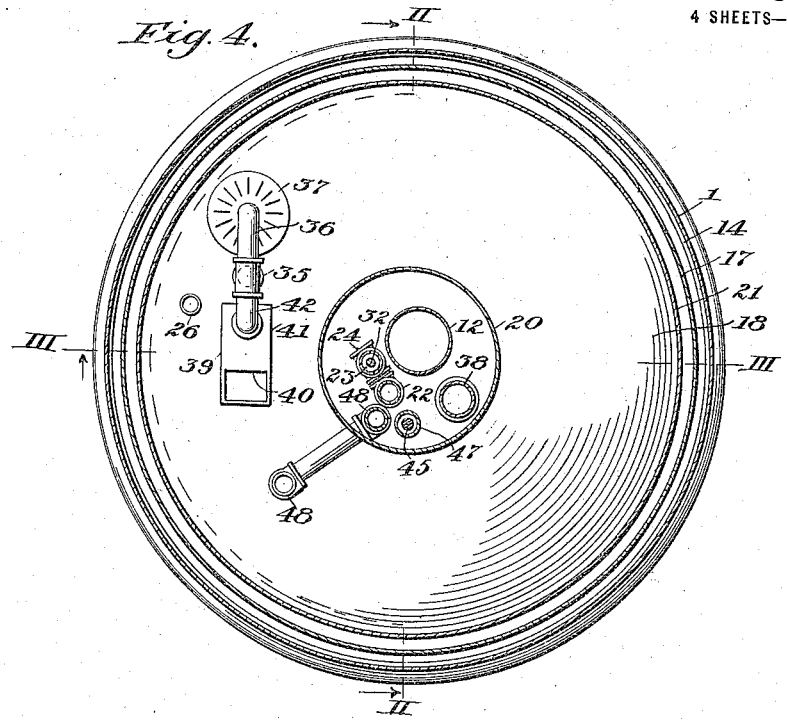

Figure 1 is a transverse vertical section of the upper half of the casing and weight-tube, showing the carbid-holder and feed-mechanism, and the upper ends of certain pipes, in elevation. Fig. 2 is a transverse vertical section, on the same plane as Fig. 1, of the lower half of the casing, and the outer walls of the generator and bell, showing the pipes, gas-washer, float-box, and agitator in elevation, and the gas back-flow trap partly broken away. The line of section II—II is indicated on Figs. 4 and 5. Fig. 3 is a transverse vertical section of the casing and walls of the generator and bell, showing the carbid, water and gas-pipes in elevation and the float-feed box in section, in a plane at right angles to that of Fig. 2, as indicated by the line III—III on Figs. 4 and 5. Fig. 3ª is a longitudinal section through the float-valve casing. Fig. 4 is a horizontal section through the bell, on the line IV—IV of Figs. 2 and 3, and Fig. 5 is a horizontal section through the generator, on the line V—V of Figs. 2 and 3.

The apparatus illustrated comprises a main outer shell or casing 1 of corrugated sheet-metal, adapted to be buried in a pit in the ground with its upper edge level with the surface. This casing has a cover 2. Secured in the upper end of the casing is a carbid-holder 3, having an open lower mouth 4 and a feeder-disk 5 carried by a vertical shaft 6 which is revolved by a train of gears 7 driven by a cable 8 and weights 9. These weights travel in a vertical tube 10 secured to one side of the casing 1. Beneath the feeder-disk 5 is a delivery-hopper 11, from which a pipe 12 extends downward to the generator. The rotation of the disk 5 and feed of carbid is controlled, through the gears 7, by interference levers 13, one of which is connected to the gas-bell and the other of which stops the feed when the carbid receptacle is opened. This feed-mechanism, being well known and shown in various patents, is not described in detail.

Figure 5:
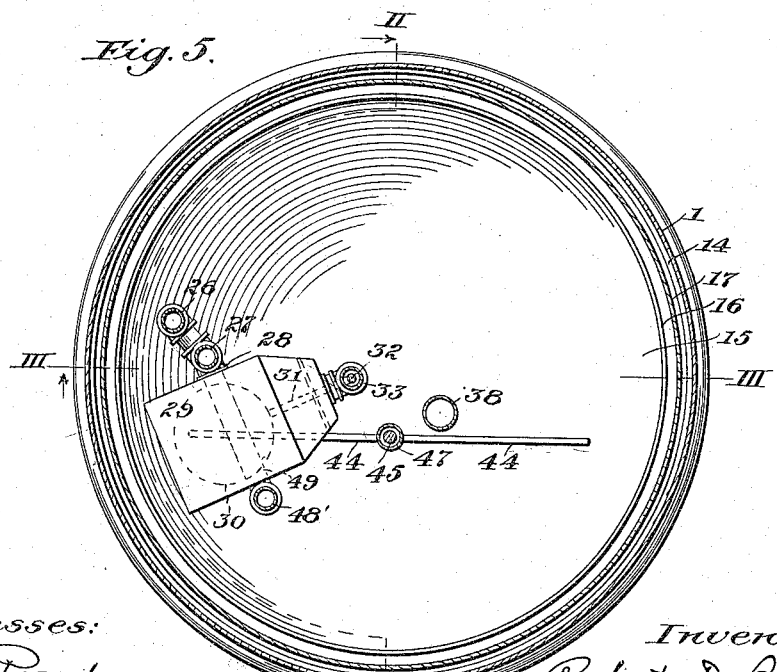

The generator, shown in Figs. 2, 3 and 5, is located at the bottom of the casing 1 and consists of two separable parts; the pan 14 having a conical bottom 15 and a concentric inner wall 16, forming a water-seal; and a dome consisting of a cylindrical wall 17, received in the water-seal, and a conical top 18. The wall 17 extends upward some distance above the partition 18, and this extension 17', with the water-tight partition 18, provides a water-tank for the annular gas-bell 19. The cylindrical inner wall 20 of the bell is concentric with the outer wall 21, but is somewhat shorter. The carbid-feed pipe 12 extends downward through the central passage formed by the inner wall 20 and opens into the generator through its top 18, being connected thereto by a water and gas-tight joint. A water-supply pipe 22 also extends downward into this central bell-passage, being connected by an elbow to a chamber containing a valve 23. A T 24, connected to the lower end of the valve-chamber, opens laterally into the bell-passage. When the valve 23 is raised, water supplied by the pipe 22 pours through the opening 24 and fills the bell-tank up to the level indicated by the line 25. When the water rises above this point, it overflows into a vertical pipe 26, which extends downward through and makes a tight joint with the partition 18, and thence nearly to the bottom of the generator. Here it is cross-connected to a short vertical pipe 27, the upper end of which opens through a T 28 into the top of the float-feed box 29. The water always present in the portions of the pipes 26, 27 below the level of the opening 28 acts as a seal to prevent passage of the gas from the generator through the pipe 26 into the bell, or vice versa. Within this box is a float 30, which is connected by an intermediately-pivoted lever 31 to a vertical rod 32 carrying at its upper end the water-feed valve 23. The valve-rod 32 is surrounded by a water-tight casing-pipe 33, which extends through and makes a tight joint with the partition 18. The water flowing into the box 29 through the opening 28 is delivered from the end of the box and through the lower end of the pipe 33 into the generator-chamber, rising therein until it reaches the level indicated by the line 34, thereby lifting the float 30 to the point where it closes the valve 23 and cuts off the further supply of water. The water-current washes out any residuum in the box.

When the bell-tank and generator have been supplied with water, and the carbid-holder has been filled and closed, assuming that the bell is down, carbid will be fed through the hopper 11 and pipe 12 into the generator, falling into the water therein, and the acetylene-gas evolved will escape from the generator through the vertical pipe 35, rising from and making a tight joint with the top 18 of the generator. The gas is delivered from the upper end of this pipe, through an elbow 36 and conical washer 37, slitted below the water-level 25, into the gas-bell 19.

The lime-residuum is pumped out of the generator through a pipe 38, leading from the bottom of the generator-chamber. This pipe extends upward through the partition 18, making a tight joint therewith, and through the central bell-passage, and its upper end, near the top of the casing 1, is threaded to receive the suction-pipe of the pump. During this operation, the generator is vented by gas from the bell, the bell being of such predetermined size that the gas held therein will fill the generator. For this purpose, a water-sealed back-flow trap 39 is provided, connected to the top of the gas-pipe 35 on the side opposite the washer 37. This trap consists of a rectangular box, partially and unequally divided by a transverse partition 40 which depends nearly to its bottom. The narrow compartment of the box is open at the top and its wider compartment has a closed top 41, connected by a pipe 42 to the top of the gas-pipe 35. When residuum is pumped out of the generator, the gas-plenum normally existing therein is changed to a partial vacuum, and the suction on the water in the larger compartment of the trap-box 39 causes the lever which is normally slightly above the lower edge of the partition 40 to rise in this compartment and correspondingly fall in the small compartment, until the lower edge of the partition 40 is uncovered on the side of the smaller compartment and the gas passes rearwardly beneath this partition and down through the pipe 35 into the generator. It will be seen that the partition 40 furnishes a water-seal against gas passing from the generator to the bell of much greater depth than the water-seal in the washer 37, but that, reversely, the water pulled up into the washer 37 by a partial vacuum in the generator gives a much deeper seal than the water pulled into the larger compartment of the trap-box 39, its level therein when gas is passing backward being at approximately the height indicated by the line 43 and the level of water in the smaller compartment of the trap-box 39 being shown at 43$^a$. The normal water level in the compartments of the trap-box 39 is indicated by the lines 43$^b$ and 43$^c$. The removal of the residuum is facilitated by stirring up the lime, an agitator consisting of two radial arms 44 being provided for this purpose. These arms are rigidly secured to the lower end of a shaft 45, the upper end of which, near the top of the casing 1, has a cranked handle 46. The shaft 45 is surrounded by a casing 47, extending through and making a tight joint with the generator top 18.

Gas is delivered from the bell through a service-pipe 48, leading downward from the upper end of the bell, thence beneath its inner wall 20, and upward through the central passage. A drip-extension 48′ extends downward from this service-pipe into the generator, making a tight joint with the partition 18. The lower end of the pipe 48′ is connected by a nipple 49 to the lower end of the water-supply pipe 27, the drip-water being thereby returned to the generator.

I claim:

1. An underground acetylene generator and holder, comprising a vertical casing, a generator in the bottom of said casing, comprising a pan having a peripheral water-seal and a removable dome depending into said seal, a water-tank and bell above said generator, and a carbid-holder and feeder in the upper part of said casing having a delivery tube opening into said generator.

2. An underground acetylene generator and holder, comprising a vertical casing, a pan in the bottom of said casing having a peripheral water-seal, a removable cylinder having its lower end in said seal, a transverse partition in said cylinder dividing it into an upper water-tank and a lower generator-dome, a bell in said tank, and a carbid-holder and feeder in the upper part of said casing having a delivery tube extending through said bell and opening into said generator.

3. In an acetylene generator, in combination, a superposed gas holder, having an annular bell and generator, a carbid-holder and feeder having a delivery tube extending through the central bell-passage and opening into said generator, a float-feed box in said generator, a valve-controlled water supply-pipe opening into said passage, a water overflow-pipe leading from the bell-chamber into said generator and communicating with said box, a water-outlet from said box into said generator, a float in said box, and connections between said float and valve.

4. In an acetylene generator, in combination, a superposed gas holder having an annular bell, and generator; a carbid-holder and feeder having a delivery tube extending through the central bell-passage and opening into said generator, a float-feed box in said generator, a water supply-pipe, controlled by a valve, opening into said passage, a water overflow-pipe, including a water-sealed trap-portion, leading from the bell-chamber into said generator and communicating with said box, a water-outlet from said box into said generator, a float in said box, connections between said float and valve and a gas service pipe leading from said bell.

5. In an acetylene generator, in combination, a superposed gas holder having an annular bell, and generator; a carbid-holder and feeder having a delivery tube extending through the central bell-passage and opening into said generator, a float-feed box in said generator, a water-supply pipe, controlled by a valve, a water overflow-pipe leading from the bell-chamber into said generator and communicating with said box, a water-outlet from said box into said generator, a float in said box, connections between said float and valve, and a gas service-pipe leading from the bell-chamber under the inner annular bell-wall and up through said passage.

6. In an acetylene generator, in combination, a superposed gas holder having an annular bell, and generator; a carbid-holder and feeder having a delivery tube extending through the central bell-passage and opening into said generator; a stationary gas service-pipe leading from the bell-chamber under the inner annular bell-wall and up through said passage; an agitator in said generator having a shaft extending through said passage; and a residuum discharge-pipe extending from said generator through said passage.

7. In an acetylene generator, in combination, a superposed gas holder having an annular bell, and generator; a carbid-holder and feeder having a delivery tube extending through the central bell-passage and opening into said generator; a valved water-supply pipe opening into said passage; a water overflow-pipe leading from the bell-chamber into said generator; a gas service-pipe leading from the bell-chamber under the inner annular bell-wall and up through said passage; an agitator in said generator having a shaft extending through said passage; and a residuum discharge-pipe extending from said generator through said passage.

8. In an acetylene generator, in combination, a superposed gas holder having an annular bell, and generator; a carbid-holder and feeder having a delivery tube extending through the central bell-passage and opening into said generator; a float-feed box in said generator; a water-supply pipe, controlled by a valve, opening into the central bell-passage; a water overflow-pipe, including a water-sealed trap-portion, leading from the bell-chamber into said generator and communicating with said box; a water-outlet from said box into said generator; a float in said box; connections between said float and valve; a gas service-pipe leading from the bell-chamber under the inner annular bell-wall and up through said passage and having a drip-extension connected to said trap; an agitator in said generator having a shaft extending through said passage; and a residuum discharge-pipe extending from said generator through said passage.

ROBERT D. BRADEN.

Witnesses:
SAMUEL N. POND,
MARY M. LEPPO.

Copies of this patent may be obtained for five cents each, by addressing the "Commissioner of Patents, Washington, D. C."